H. C. BERGERUD.
SPRING WHEEL.
APPLICATION FILED JULY 13, 1910.
999,197.
Patented Aug. 1, 1911.
2 SHEETS—SHEET 1.
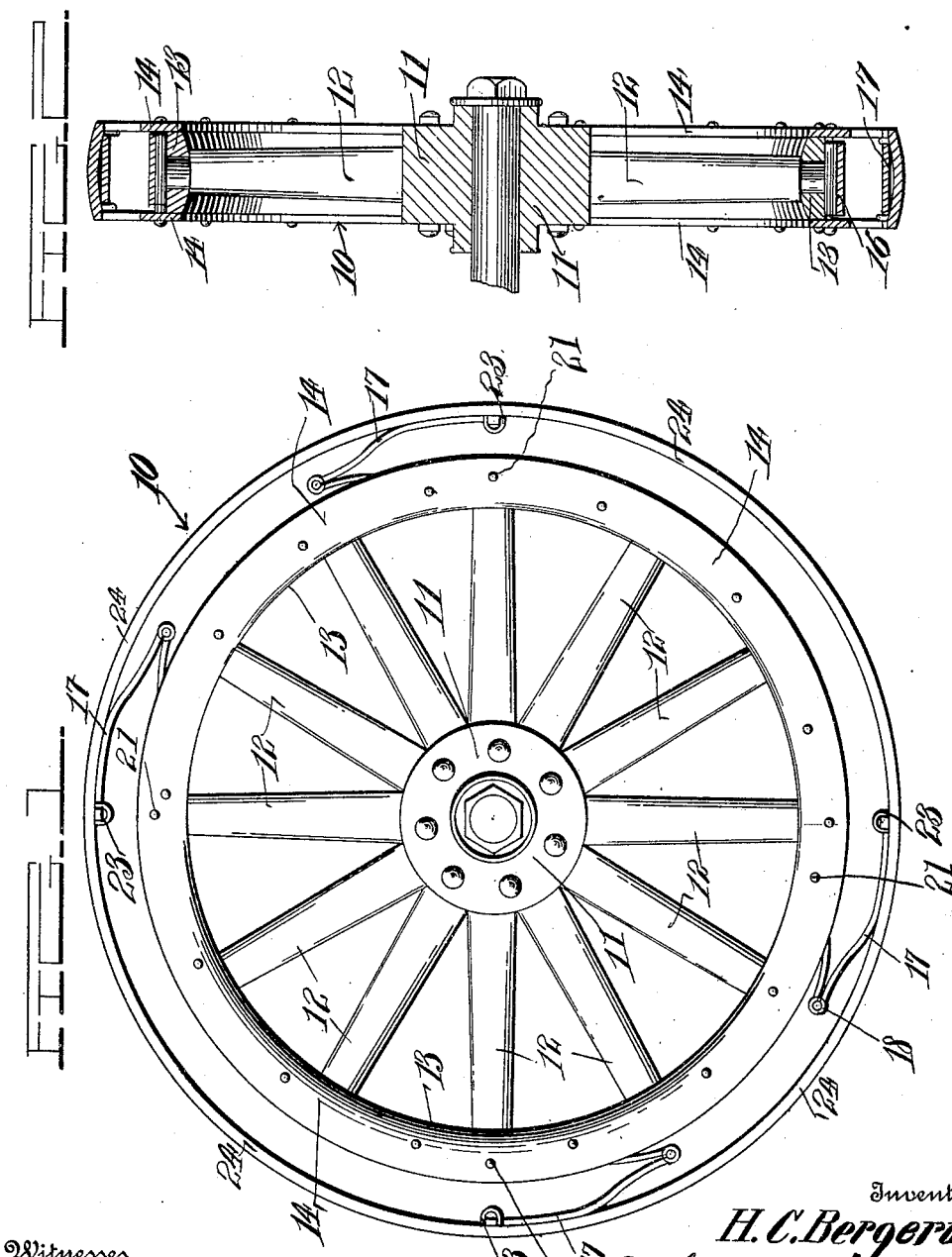
Witnesses
F. W. Taylor
Inventor
H. C. Bergerud.
By
Attorneys H. C. BERGERUD.
SPRING WHEEL.
APPLICATION FILED JULY 13, 1910.
999,197.
Patented Aug. 1, 1911.
2 SHEETS—SHEET 2.
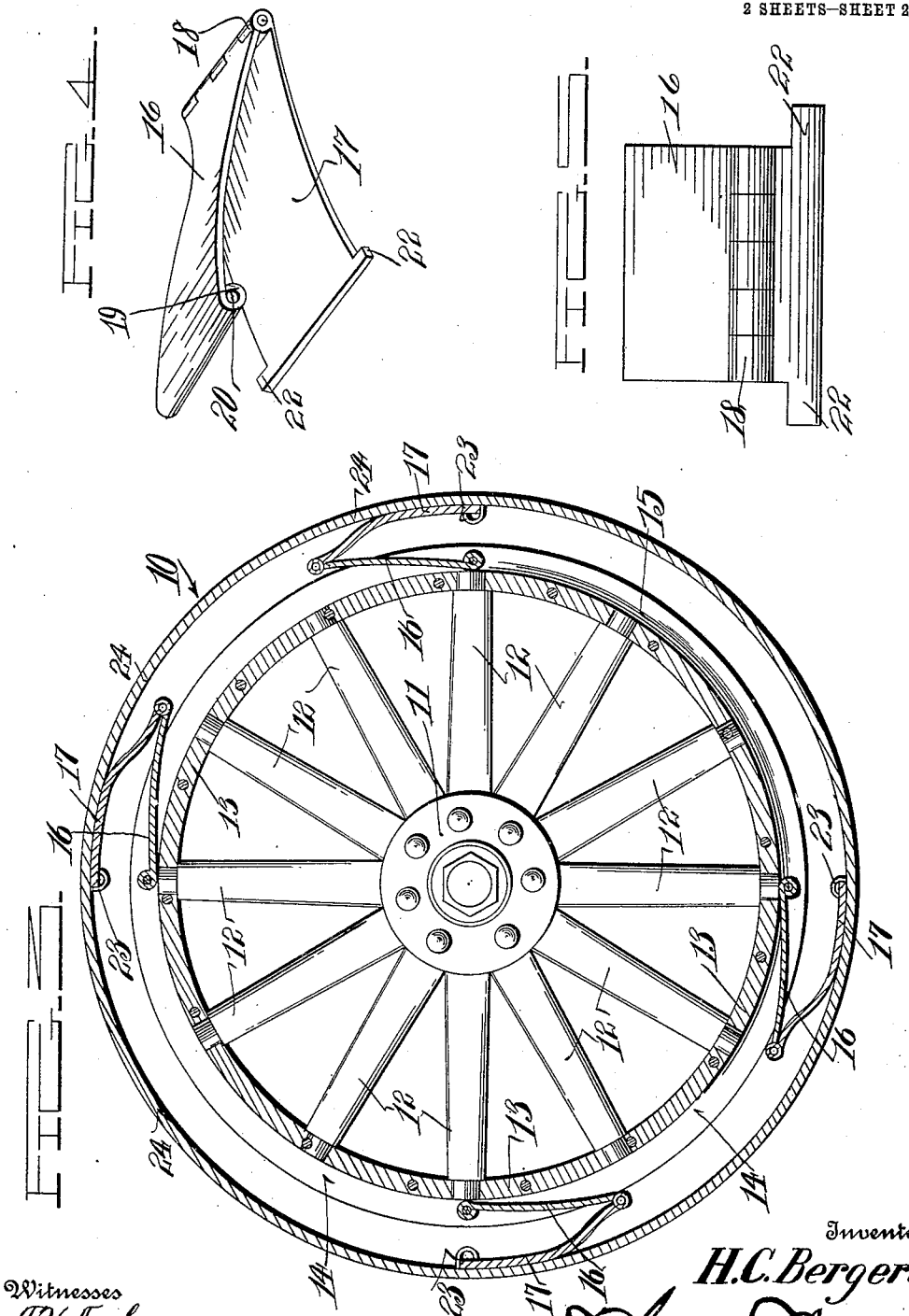
Witnesses
F. W. Taylor
Inventor
H. C. Bergerud.
By
Attorney

UNITED STATES PATENT OFFICE.

HANS C. BERGERUD, OF FERGUS FALLS, MINNESOTA.

SPRING-WHEEL.

999,197. Specification of Letters Patent. Patented Aug. 1, 1911.

Application filed July 13, 1910. Serial No. 571,795.

*To all whom it may concern:*

Be it known that I, HANS C. BERGERUD, a citizen of the United States, residing at Fergus Falls, in the county of Ottertail, State of Minnesota, have invented certain new and useful Improvements in Spring-Wheels; and I do hereby declare the following to be a full, clear, and exact description of the invention, such as will enable others skilled in the art to which it appertains to make and use the same.

The invention relates to a spring tire and more particularly to the class of spring tires for vehicles, such as automobiles, bicycles, carriages or the like.

The primary object of the invention is the provision of a tire of this character in which vibrations between the rim or tire and the hub of the wheel will be minimized and to render it unnecessary to employ a pneumatic tire on the wheel.

Another object of the invention is the provision of a tire of this character in which the tread or tire portion thereof will readily yield to obstructions or other irregularities in the ground, yet will possess the requisite strength and thus obviate the necessity of using springs to connect the vehicle body with its axle.

A further object of the invention is the provision of a tire of this character in which all shocks and jars will be absorbed or minimized so as to overcome jolting of a vehicle thereby increasing the life of the same.

A still further object of the invention is the provision of a tire of this character which is simple in construction, thoroughly reliable and efficient in operation and inexpensive in manufacture.

With these and other objects in view the invention consists in the construction, combination and arrangement of parts as will be hereinafter more fully described illustrated in the accompanying drawings, disclosing the preferred form of embodiment of the invention and pointed out in the claim hereunto appended.

In the drawings:—Figure 1 is a side elevation of a vehicle wheel constructed in accordance with the invention. Fig. 2 is a vertical transverse sectional view thereof. Fig. 3 is a vertical longitudinal sectional view through the wheel. Fig. 4 is a detail perspective view of one of the spring members. Fig. 5 is an end elevation thereof.

Similar reference characters indicate corresponding parts throughout the several views in the drawings.

Referring to the drawings by numerals 10 designates generally a vehicle wheel which is of the ordinary well-known construction having the usual hub 11 from which extend radial spokes 12 the outer ends of which have fixed thereto a felly or rim 13 and to opposite side faces of this rim 13 are fixed rings or annuli 14 between which is formed a channel 15, the rings 14 being connected to opposite side faces of the said ring in any suitable manner.

At suitable intervals about the outer periphery of the rim 13 within the channel 15 formed by the rings 14 are disposed spring members each comprising resilient metallic plates 16 and 17, these plates being connected together by a hinged joint 18. Each plate 16 at its free end is inwardly curled on itself as at 19 to provide an eye 20 through which is passed a bolt member 21 the latter being also passed through the side rings 14 for pivotally connecting the said plates 16 within the channel 15, while the plate 17 at its free end is provided with laterally extending lugs 22 formed integral and these lugs engage in staples 23 fixed to and projecting inwardly from a metallic tire 24 the latter arranged circumferentially of the rim 13 and spaced therefrom by means of the spring members.

As clearly shown in Fig. 3 of the drawings the two hingedly connected plates 16 and 17 are differently formed, the plates 16 being of a gradual curvature and out of contact with the rim 13 while the plates 17 are of a compound curvature, whereby contacting bearing surfaces are formed from the movable connections of the plates with the tire 24 along a suitable portion of their length. It is further to be observed that by the employment of the springs thus constructed that when the wheel strikes an obstruction there will be no sudden impact between said springs and tire, the several parts compensating to any irregularity between the tire and rim of the wheel, and further the bearing surfaces of the springs 17 serves to hold said tire in proper position in respect to the rim.

It will be obvious that the tire 24 when it strikes an obstruction or overrides an irregular surface will yield and adjust itself relative to the wheel so as to absorb or take up the shock by reason of the intermediate spring members between the felly and the said tire thus minimizing the vibration that would otherwise be imparted to a vehicle body and thereby obviate the necessity of the employment of pneumatic tires or the like on the vehicle wheels.

What is claimed is:—

In combination, a wheel having a rim formed with a channel, an auxiliary tire for the wheel, and a series of springs connected to the rim and tire and interposed therebetween, each spring consisting of two members hingedly connected to each other, one of the members being formed of gradual curvature the end of which is pivotally attached to the rim, and the other member being formed of compound curvature the end of which is removably attached to the tire, whereby extended bearing surfaces are formed for contact with the tire with the hingedly connected portions of the springs located midway between the tire and rim.

In testimony whereof, I affix my signature, in presence of two witnesses.

HANS C. BERGERUD.

Witnesses:
A. G. ANDERSON,
P. A. ANDERSON.

Copies of this patent may be obtained for five cents each, by addressing the "Commissioner of Patents, Washington, D. C."